US011455481B2

(12) United States Patent
Oka

(10) Patent No.: US 11,455,481 B2
(45) Date of Patent: Sep. 27, 2022

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Hiroto Oka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 17/089,274

(22) Filed: Nov. 4, 2020

(65) Prior Publication Data

US 2021/0142022 A1    May 13, 2021

(30) Foreign Application Priority Data

Nov. 7, 2019    (JP) ............................. JP2019-202220

(51) Int. Cl.
*G06K 7/14* (2006.01)
*H04N 5/232* (2006.01)
*H04N 5/247* (2006.01)

(52) U.S. Cl.
CPC ......... *G06K 7/1417* (2013.01); *G06K 7/1443* (2013.01); *G06K 7/1456* (2013.01); *H04N 5/23299* (2018.08); *H04N 5/247* (2013.01)

(58) Field of Classification Search
None
See application file for complete search history.

(56) References Cited

U.S. PATENT DOCUMENTS

2019/0005286 A1\* 1/2019 Suman ............... G06K 7/10732

FOREIGN PATENT DOCUMENTS

| CN | 107111737 A | \* | 8/2017 | ......... G06K 7/10881 |
| CN | 110929540 A | \* | 3/2020 | |
| JP | 2011-142685 A | | 7/2011 | |

\* cited by examiner

*Primary Examiner* — Kristy A Haupt
(74) *Attorney, Agent, or Firm* — Canon U.S.A., Inc. IP Division

(57) ABSTRACT

An image processing apparatus is configured to scan code from a first image captured by a first camera, to acquire a second image captured by a second camera different from the first camera in a case where not all of the code is successfully scanned from the first image, and to scan code from the second image. The image processing apparatus is further configured to compare the code scanned from the first image with the code scanned from the second image, and to acquire a piece of the code scanned from the second image instead of a piece of code scanned from the first image that has not been successfully scanned from the first image in a case where the code scanned from the first image and the code scanned from the second image are at least partially same as a result of comparison.

18 Claims, 16 Drawing Sheets

FIG.8

| ID | COUNTER | DIVISIONAL IMAGE CAPTURING COORDINATE X | DIVISIONAL IMAGE CAPTURING COORDINATE Y | LAYOUT INFORMATION | ZOOM RANGE X0X1Y0Y1 | DETECTED NUMBER | DETECTION No. | CENTRAL COORDINATE X | CENTRAL COORDINATE Y | CODE ANGLE | DETECTED CODE | RELIABILITY | DICTIONARY NUMBER | DETECTED NUMBER DETERMINATION | DICTIONARY MATCHING DETERMINATION | COMPREHENSIVE DETERMINATION |
|---|---|---|---|---|---|---|---|---|---|---|---|---|---|---|---|---|
| 1 | 1 | 190 | 300 | 0,0 | 170, 210, 280, 310 | 2 | 1 | 670 | 773 | 5 | AAA12345 | 99 | 6 | OK | OK | OK |
| 2 | 2 | 190 | 330 | 0,1 | 170, 240, 280, 340 | 2 | 2 | 675 | 916 | 5 | BBB11222 | 97 | 7 | OK | OK | OK |
| 3 | 3 | 190 | 360 | 0,2 | 170, 270, 280, 370 | 0 | — | — | — | — | — | — | — | NG | NG | NG |

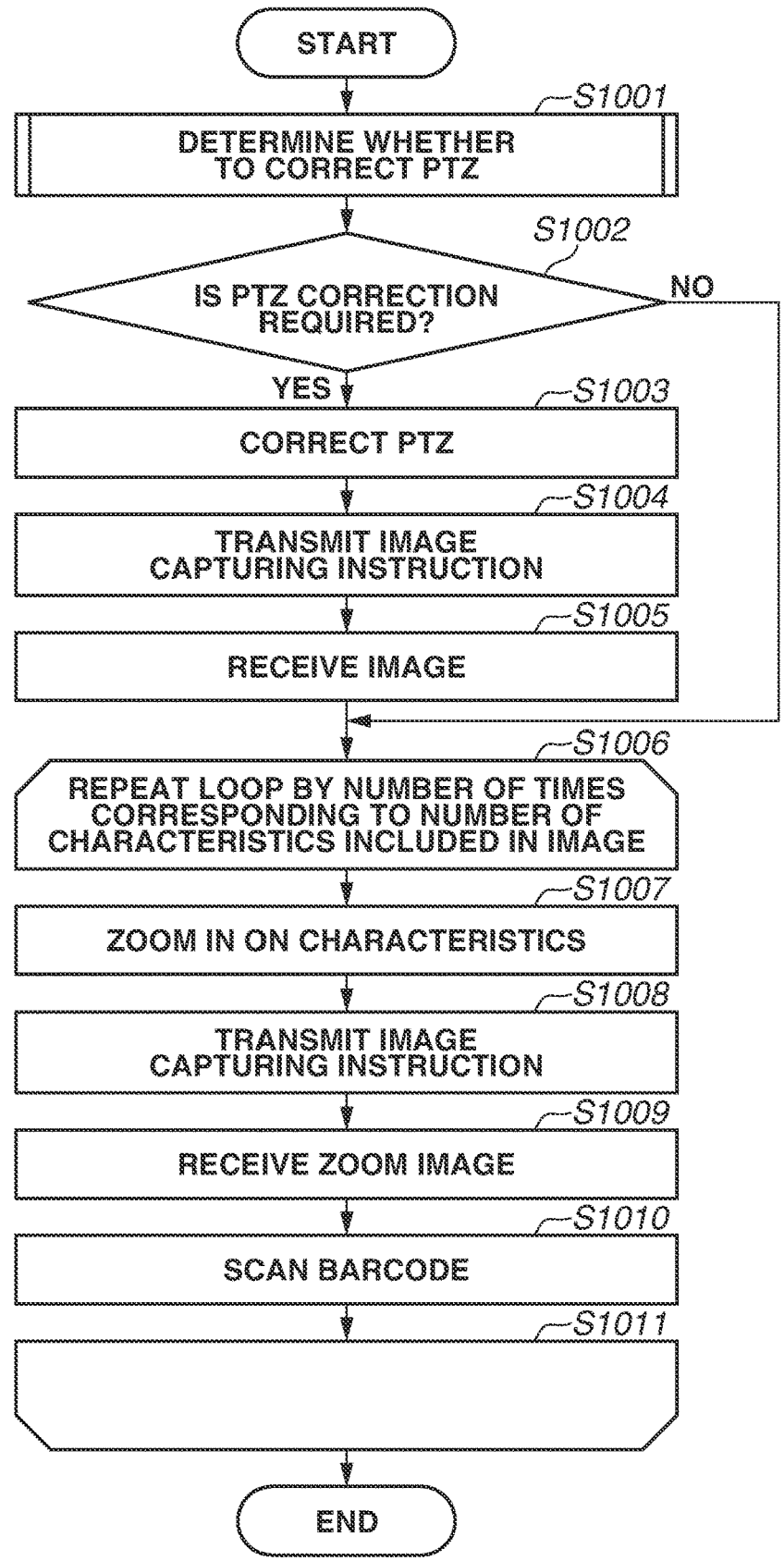

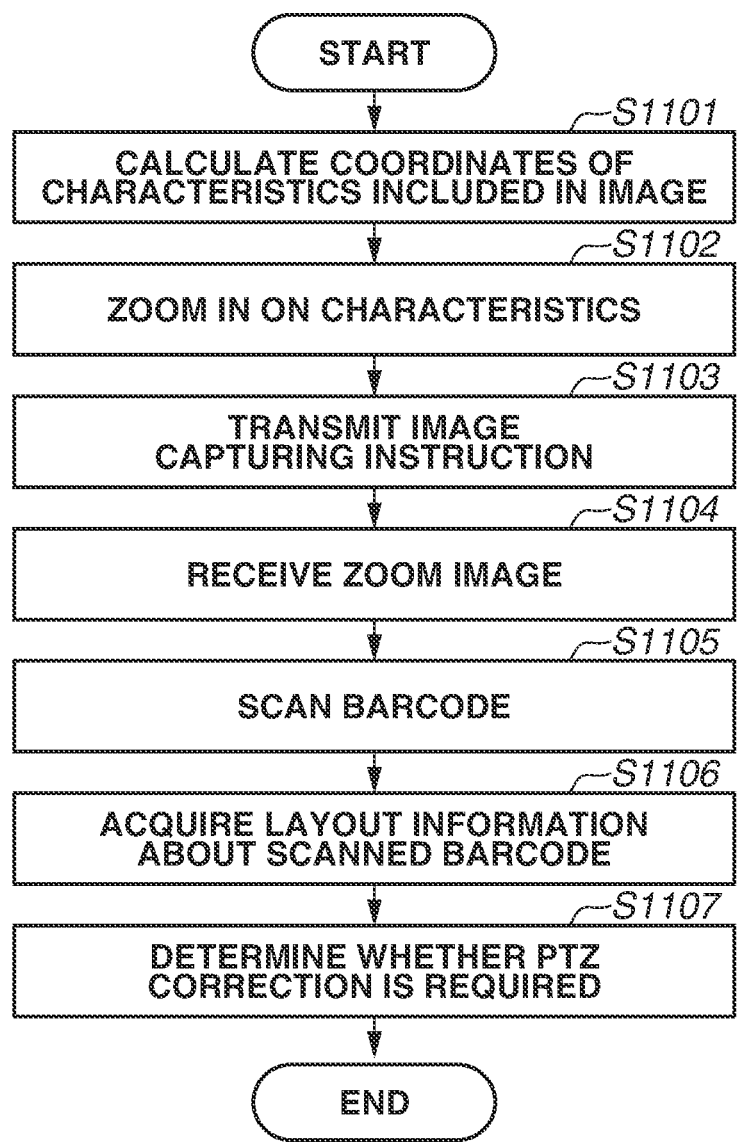

FIG.13

| DATE AND TIME | CAMERA ID | SCANNING RESULT | PAN | TILT | ZOOM |
|---|---|---|---|---|---|
| 2019/7/4/10:05:20 | 1 | SUCCESSFUL | 40.6 | 10.3 | 3.2 |
| 2019/7/4/10:05:21 | 2 | FAILED | | | |
| 2019/7/4/10:05:21 | 3 | INTERRUPTED | | | |
| 2019/7/11/10:03:50 | 1 | SUCCESSFUL | 40.6 | 10.3 | 3.2 |
| 2019/7/18/10:06:40 | 1 | FAILED | | | |
| 2019/7/18/10:09:23 | 3 | SUCCESSFUL | 70.2 | 11.5 | 4.0 |

IMAGE PROCESSING APPARATUS, IMAGE PROCESSING METHOD, AND STORAGE MEDIUM STORING PROGRAM

BACKGROUND

Field of the Disclosure

The present disclosure relates in particular to a technique of scanning information, such as a barcode.

Description of the Related Art

A method in which articles are managed in such a manner that a barcode, a two-dimensional code, or the like (hereinafter referred to as a barcode or the like) attached to each cargo is scanned by staff using a handy terminal or the like in facilities, such as a factory or warehouse, has heretofore been employed. Japanese Patent Application Laid-Open No. 2011-142685 discusses a camera control system capable of rapidly controlling a camera to be brought into a desired operating state. With this technique, an image of each cargo to which a barcode or the like is attached is captured by a camera installed at a corner of facilities and the barcode or the like attached to each cargo is scanned. This leads to a reduction in time and labor for staff.

However, in actual facilities, people may come and go and articles for operation may be temporarily placed. This raises an issue that the barcode or the like is hidden by a person or article located within the angle of view of the camera, which makes it difficult to scan the barcode or the like.

SUMMARY

According to embodiments of the present disclosure, an image processing apparatus includes one or more processors and at least one memory storing executable instructions which, when executed by the one or more processors, cause the image processing apparatus to scan first code from a first image captured by a first camera, acquire a second image captured by a second camera different from the first camera in a case where a piece of the first code has not been successfully scanned from the first image, scan second code from the second image, compare the first code scanned from the first image with the second code scanned from the second image, and acquire at least a piece of the second code scanned from the second image instead of a piece of the first code that has not been successfully scanned from the first image in a case where the first code scanned from the first image and the second code scanned from the second image are at least partially same as a result of the comparison.

Further features of the present disclosure will become apparent from the following description of exemplary embodiments with reference to the attached drawings.

BRIEF DESCRIPTION OF THE DRAWINGS

FIG. 8 is a table illustrating an example of barcode scanning results.

FIG. 10 is a flowchart illustrating an example of a detailed procedure of scanning processing of scanning data from an image captured by a selected NW camera according to the first exemplary embodiment.

FIG. 11 is a flowchart illustrating an example of a detailed procedure of processing for determining whether correction of pan, tilt, and zoom for the selected NW camera is required according to the first exemplary embodiment.

FIG. 13 is a table illustrating an example of history information related to scanning according to a second exemplary embodiment.

DESCRIPTION OF THE EMBODIMENTS

Exemplary embodiments of the present disclosure will be described below with reference to the drawings.

Figure 1:
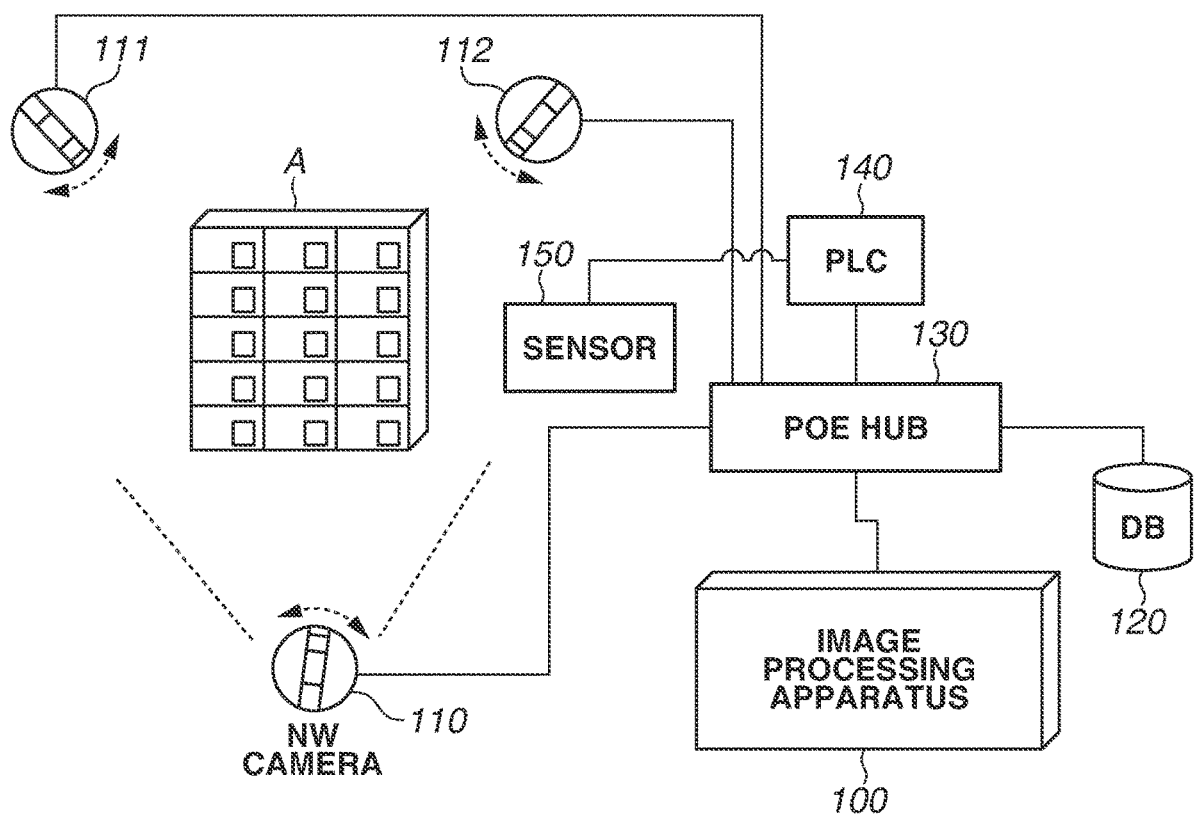
FIG. 1 illustrates an example of an overall configuration of an image processing system according to a first exemplary embodiment.

A first exemplary embodiment will be described below. FIG. 1 illustrates an example of an overall configuration of an image processing system according to the first exemplary embodiment. The image processing system according to the first exemplary embodiment is a system for capturing an image of each cargo carried into a factory or the like, scanning a barcode or the like attached to each cargo, and comparing information about the scanned barcode with contents of preliminarily registered barcodes, thereby checking whether a package or the like is carried into the factory or the like on schedule. In the first exemplary embodiment, it is also assumed that tags are respectively attached to packages included in each cargo, which is an image capturing target, and a barcode or the like is printed on each tag. The image processing system according to the first exemplary embodiment sequentially scans the barcode or the like printed on each of the tags respectively attached to the packages, and compares the scanned barcodes. The first exemplary embodiment illustrates an example where barcodes are scanned and compared by an image processing apparatus 100. However, an object to be scanned and compared is not limited to barcodes. As other examples of the object to be scanned, data such as a two-dimensional code, Chameleon Code®, a number, a character, and a symbol may be used. In addition, a shape of a figure or the like that represents the pieces of information described above based on certain regulations may also be used.

The image processing system according to the first exemplary embodiment includes the image processing apparatus 100, network (NW) cameras 110 to 112, a database (DB) 120, and a Power over Ethernet (POE) hub 130. The image processing system further includes a programmable logic controller (PLC) 140 and a sensor 150.

The POE hub 130 is connected to each of the image processing apparatus 100, the NW cameras 110 to 112, the DB 120, and the PLC 140 to communicate with them, and supplies power to each of the image processing apparatus 100, the NW cameras 110 to 112, the DB 120, and the PLC 140. In the DB 120, contents of barcodes printed on a plurality of tags respectively attached to a plurality of packages, which is scheduled to be carried into a factory or the like, are registered in advance. The PLC 140 controls an overall operation of the image processing system. The sensor 150 detects that each cargo has been carried into a predetermined position.

The image processing apparatus 100 is connected to each of the NW cameras 110 to 112 via the POE hub 130, and transmits a control command to be described below, to thereby control an image capturing operation of each of the NW cameras 110 to 112. The NW camera 110 is installed to capture an image of a place into which a cargo A is carried. The NW camera 110 captures an image of the cargo A under the control of the image processing apparatus 100. In this case, the cargo A includes a plurality of stacked packages to which tags are respectively attached. Further, the image processing apparatus 100 receives the image obtained by the NW camera 110 via the POE hub 130. The image processing apparatus 100 detects an image of the tag on which a barcode is printed in the received image, and scans the barcode. The image processing apparatus 100 compares information of the barcode scanned from the image with barcode information stored in the DB 120, and in this way, whether a package or the like has been carried into the factory or the like on schedule can be confirmed. The NW camera 111 and the NW camera 112 are cameras that function to monitor the inside of the factory. For the sake of easy explanation, the first exemplary embodiment illustrates a case where three NW cameras are used. While the first exemplary embodiment illustrates an example where packages are carried into a factory or the like, the first exemplary embodiment is also applicable to comparison processing to be performed when packages are carried out from the factory or the like.

Figure 2:
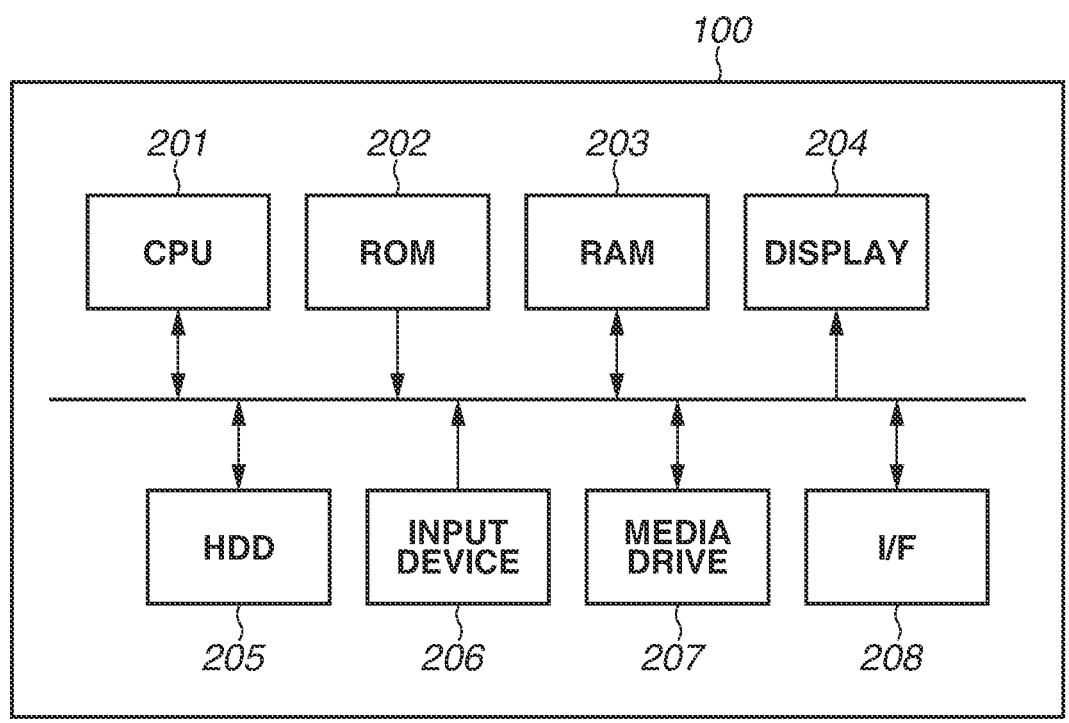
FIG. 2 is a block diagram illustrating an example of a hardware configuration of an image processing apparatus.

FIG. 2 is a block diagram illustrating an example of a hardware configuration of the image processing apparatus 100. The image processing apparatus 100 includes a central processing unit (CPU) 201, a read-only memory (ROM) 202, a random access memory (RAM) 203, a display 204, a hard disk drive (HDD) 205, an input device 206, a media drive 207, and an interface (I/F) 208.

The CPU 201 reads out programs stored in the ROM 202 and executes the programs to perform various processing. The RAM 203 is used as a temporary storage area such as a main memory or a work area for the CPU 201. The HDD 205 stores various data, various programs, and the like. The display 204 displays various information. The input device 206 receives various operations performed by a user. The media drive 207 is configured to, for example, read out data from media, such as a secure digital (SD) card, or write data into media. The I/F 208 communicates with an external apparatus.

The functions and processing of the image processing apparatus 100 to be described below are implemented such that the CPU 201 reads out programs stored in the ROM 202 or the HDD 205 and executes the programs. In another example, the CPU 201 may read out programs stored in a recording medium, such as an SD card, instead of reading out programs stored in the ROM 202 and the like. In yet another example, at least some of the functions and processing of the image processing apparatus 100 may be implemented by causing a plurality of CPUs, RAMs, ROMs, and storages to cooperate with each other. In yet another example, at least some of the functions and processing of the image processing apparatus 100 may be implemented using a hardware circuit.

Figure 3:
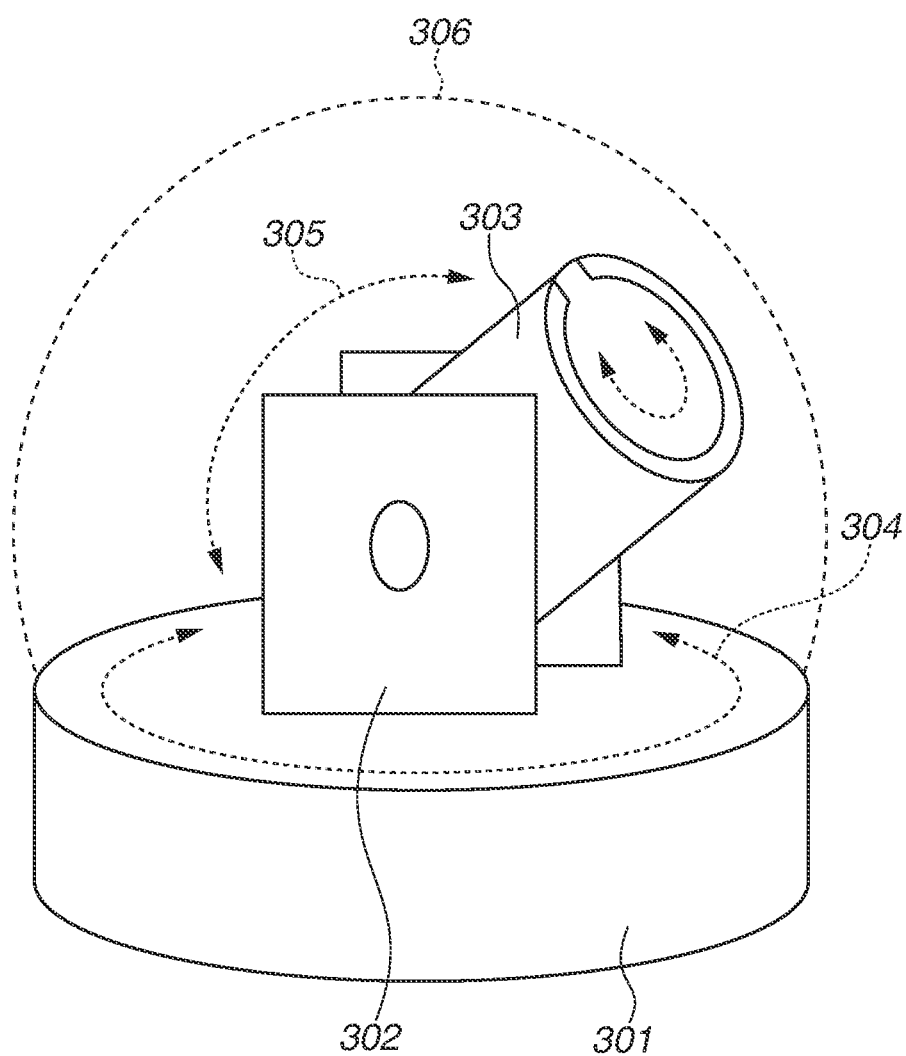
FIG. 3 illustrates an example of an external configuration of a network (NW) camera.

FIG. 3 illustrates an example of an external configuration of the NW camera 110. The NW camera 111 and the NW camera 112 have an external configuration similar to that of the NW camera 110, and thus the descriptions thereof are omitted.

As illustrated in FIG. 3, a pan driving portion 301 changes the orientation of a barrel portion 303 in a direction indicated by a pan direction 304 by using driving of a pan motor. A tilt driving portion 302 changes the orientation of the barrel portion 303 in a direction indicated by a tilt direction 305 by using driving of a tilt motor. The barrel portion 303 includes a focusing lens and a zoom lens, each of which is driven by a stepping motor. The entire NW camera 110 is covered with a dome 306.

Figure 4:
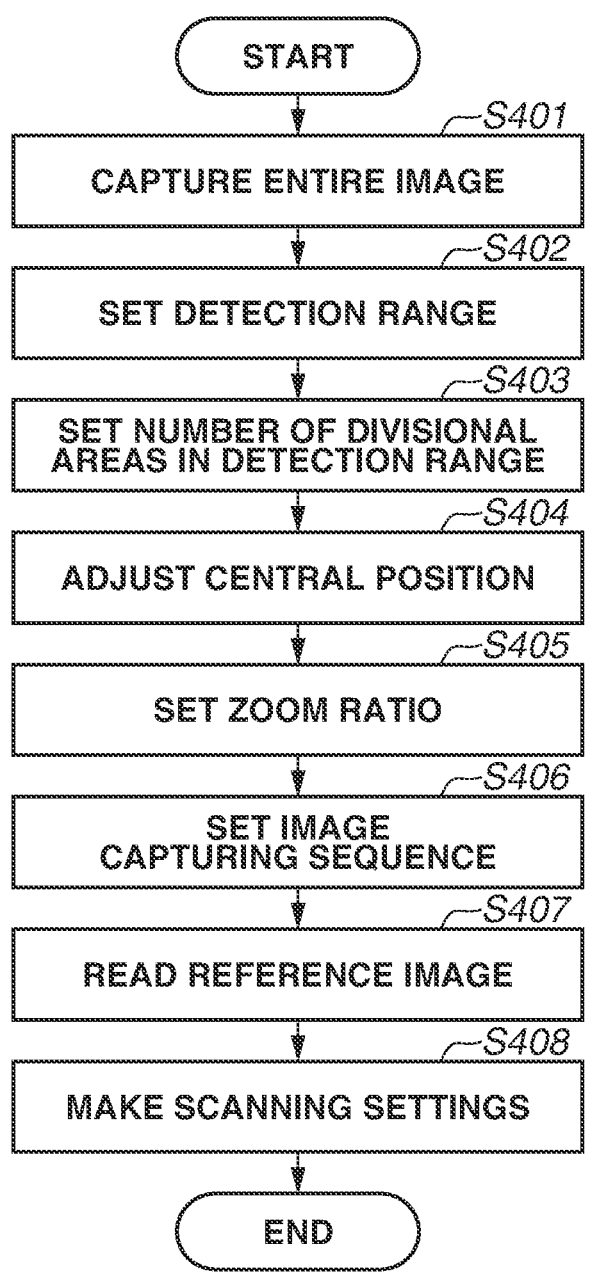
FIG. 4 is a flowchart illustrating an example of a procedure of preparation processing.
Figure 5:
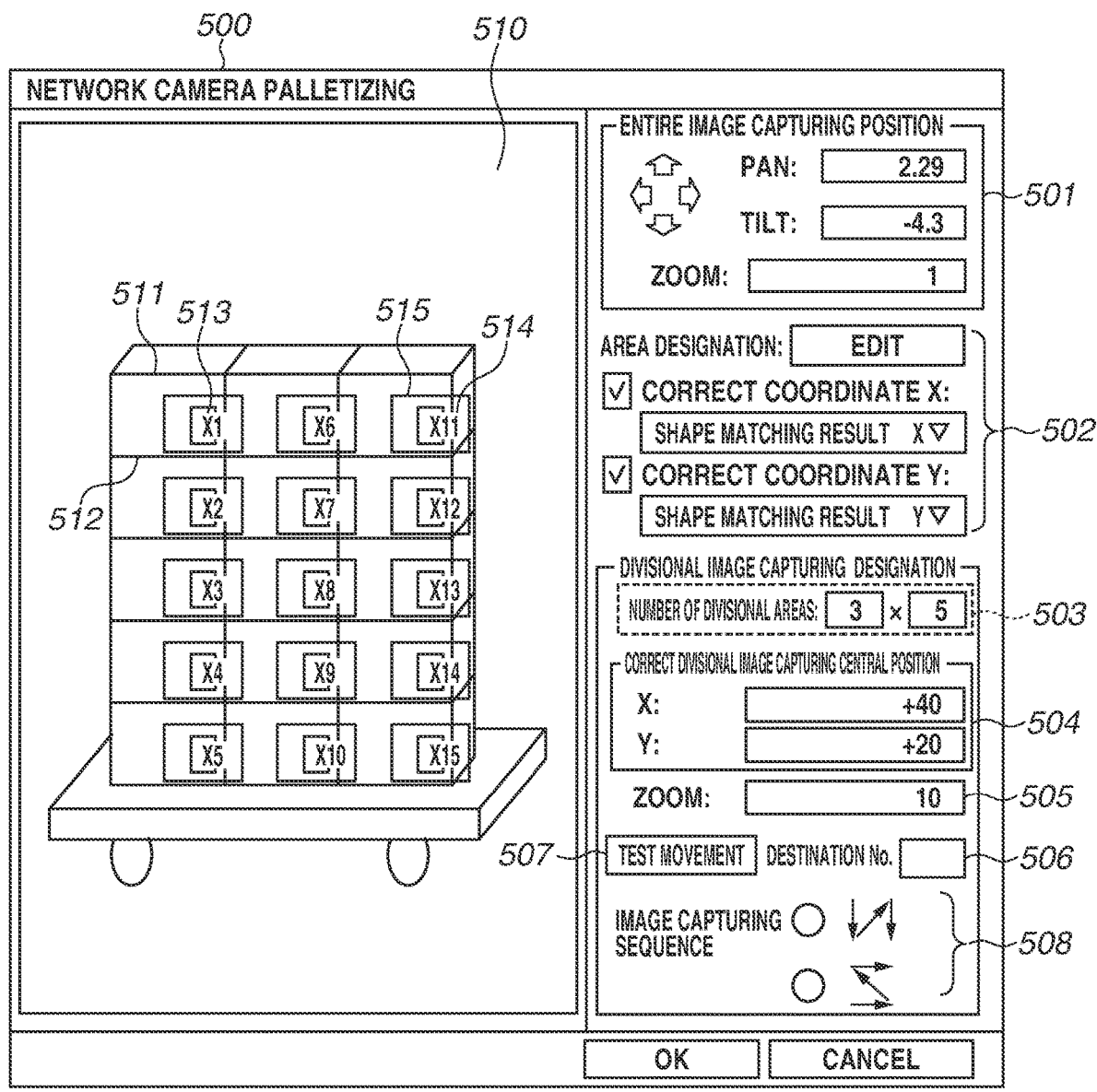
FIG. 5 illustrates an example of a setting screen to be displayed when execution of preparation processing is started.

FIG. 4 is a flowchart illustrating an example of a procedure of preparation processing performed by the image processing apparatus 100. The preparation processing is processing for setting an image capturing position for the NW camera 110 and making various settings for scanning barcodes. FIG. 5 illustrates an example of a setting screen 500 to be displayed on the display 204 of the image processing apparatus 100 when execution of the preparation processing is started.

In step S401, the CPU 201 controls the NW camera 110 to capture an entire image so that the entire cargo A is included in an image capturing range. In the case of capturing the entire image, the user can make settings for pan, tilt, and zoom in an area 501 of the setting screen 500 via the input device 206. The CPU 201 generates a control command according to the pan, tilt and zoom settings made by a user operation, and transmits the control command to the NW camera 110. The NW camera 110 receives the control command from the image processing apparatus 100, performs image capturing processing by performing pan/tilt/zoom operations according to settings indicated by the control command to acquire the entire image, and transmits the entire image to the image processing apparatus 100. The CPU 201 controls the received entire image to be displayed in an area 510 of the setting screen 500.

Next, in step S402, the CPU 201 sets an area corresponding to the cargo A in the entire image as a detection range from which a barcode is detected. Specifically, the CPU 201 detects the area corresponding to the cargo A based on predetermined image recording processing, such as edge detection, and sets coordinates of the detected area as the barcode detection range. Further, in an area 502 of the setting screen 500, the user can change the detection range via the input device 206. When a user operation is performed, the CPU 201 changes the detection range according to the user operation. The CPU 201 superimposes and displays a frame 511, which indicates the detection range, on the entire image.

Next, in step S403, the CPU 201 acquires the number of divisional areas into which the detection range is divided in response to the user operation, and sets the number of divisional areas into which the detection range is divided.

Specifically, when the user inputs the number of divisional areas in a vertical direction and the number of divisional areas in a horizontal direction in an area 503 of the setting screen 500 via the input device 206, the CPU 201 determines the number of divisional areas based on the input. For example, in the example illustrated in FIG. 5, three packages are arranged in the horizontal direction and five packages are arranged in the vertical direction. Accordingly, the user inputs 3×5 divisional areas. The CPU 201 sets the number of divisional areas corresponding to the value input by the user, and draws dividing lines 512 for equally dividing the detection range depending on the number of divisional areas into which the detection range is divided. Further, the CPU 201 assigns a number indicating an image capturing sequence to each divisional area, and displays a number 514 which is assigned to each divisional area. The CPU 201 also displays a cross mark 513 indicating the position of the center of an image being captured during a zoom image capturing operation to be described below. The cross mark 513 is displayed at the center of each divisional area in an initial state.

Next, in step S404, when a correction value for the central position in the zoom image capturing operation is input in an area 504 of the setting screen 500 by a user operation, the CPU 201 corrects the central position in the zoom image capturing operation (central position of each divisional area in the initial state) based on the input by moving the central position from the current position. Further, the CPU 201 moves the position at which the cross mark 513 is displayed in response to the movement of the central position in the zoom image capturing operation. The user inputs the correction value in the area 504 via the input device 206 to change the central position, thereby adjusting the central position in the zoom image capturing operation so that the central position is to be superimposed on a barcode to be scanned.

Next, in step S405, when the user inputs a zoom ratio in an area 505 of the setting screen 500 via the input device 206, the CPU 201 sets the zoom ratio for the zoom image capturing operation based on the input. In this case, the zoom ratio set in the area 505 is greater than the zoom ratio set in the area 501. Accordingly, the image capturing range of a zoom image captured at the zoom ratio set in the area 505 is smaller than that of the entire image captured at the zoom ratio set in the area 501. Further, the CPU 201 superimposes and displays an image capturing range 515, which is determined depending on the set zoom ratio and the central position in the zoom image capturing operation, on the entire image. In this case, the image capturing range 515 is an example of the scanning range for barcode scanning, and the processing of steps S403 to S405 is an example of specific processing for collectively identifying the image capturing ranges of zoom images respectively corresponding to a plurality of divisional areas, i.e., the barcode scanning ranges.

For example, assume that, when "10" is designated as the zoom ratio, an image obtained by reducing the entire image to one-tenth of the original image in the vertical direction and the horizontal direction can be captured. The width of the entire image is represented by baseW and the height of the entire image is represented by baseH. In addition, the zoom ratio is represented by curZoom, the width of a zoom image capturing range is represented by zoomW, and the height of the zoom image capturing range is represented by zoomH. In this case, the zoom image capturing range is expressed as shown below.

$$zoomW = baseW \div curZoom$$

$$zoomH = baseH \div curZoom$$

When the user inputs a number for designating a divisional area in an area 506 via the input device 206 and presses a test movement button 507, the CPU 201 acquires the central position in the zoom image capturing operation set in step S404 for the divisional area corresponding to the designated number. Then, the CPU 201 generates a control command for capturing an image at the zoom ratio set in step S405 by setting the central position as the center in the image capturing operation, and transmits the control command to the NW camera 110. The NW camera 110 receives the control command from the image processing apparatus 100, performs image capturing processing by performing pan/tilt/zoom operations based on settings indicated by the control command to acquire a zoom image, and transmits the zoom image to the image processing apparatus 100. Further, the CPU 201 controls the zoom image received from the NW camera 110 so that the zoom image is to be displayed in the area 510. The user can check whether the image of the barcode is appropriately captured in the zoom image displayed in the area 510, and can adjust the zoom ratio by changing the value input in the area 505, as needed.

In this case, when the value input in the area 505 is changed, the CPU 201 regenerates a new control command and transmits the control command to the NW camera 110. The NW camera 110 performs image capturing processing in response to the new control command to acquire a new zoom image, and transmits the new zoom image to the image processing apparatus 100. In this way, the CPU 201 can receive the zoom image obtained by the image capturing processing at the changed zoom ratio from the NW camera 110 and can display the zoom image in the area 510, so that the user can check the change result.

Next, in step S406, the CPU 201 sets an image capturing sequence, which is designated by the user in an area 508 via the input device 206, as the image capturing sequence of the zoom images. In the first exemplary embodiment, two types of image capturing sequences, i.e., vertical image capturing and horizontal image capturing, can be selected. In vertical image capturing, images of divisional areas in one column are sequentially captured in the vertical direction, and then images of divisional areas in a next column on the right of the one column are sequentially captured in the vertical direction. In horizontal image capturing, images of divisional areas in one row are sequentially captured in the horizontal direction, and then images of divisional areas in a next row immediately below the one row are sequentially captured in the horizontal direction. Thus, images of adjacent divisional areas are sequentially captured, so that the amount of pan and tilt movements for capturing an image in the next image capturing range can be reduced. FIG. 5 illustrates an example of the image capturing sequence when vertical image capturing is set. When horizontal image capturing is set, the display of the image capturing sequence is also changed. The above-described image capturing sequences are merely examples, and other image capturing sequences may also be used as long as the amount of pan and tilt movements is small.

Next, in step S407, the CPU 201 reads a reference image. The term "reference image" used herein refers to an image based on which a zoom image scanning target is set. For example, the zoom image displayed in the area 510 in step S405 is stored in the HDD 205, and the zoom image is read as the reference image.

Figure 6:
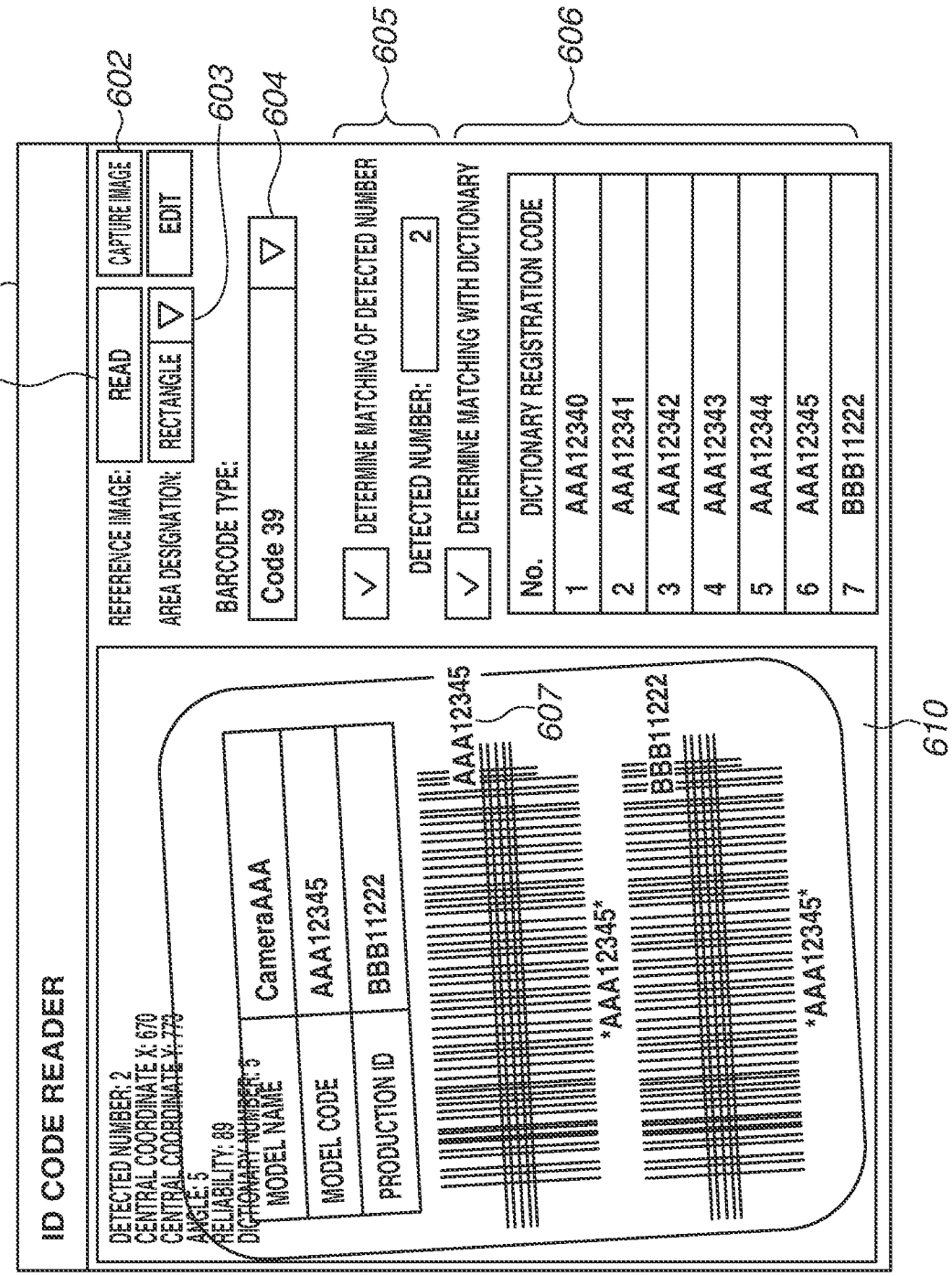
FIG. 6 illustrates an example of a setting screen to make various settings for scanning.

Next, in step S408, the CPU 201 makes various settings for scanning a scanning target (i.e., a barcode in the present exemplary embodiment) in response to a user operation. FIG. 6 illustrates an example of a setting screen 600 that receives the user operation for making various settings for scanning. The user inputs various settings on the setting screen 600. The reference image is displayed in an area 610 of the setting screen 600. When a read button 601 is pressed, the zoom image preliminarily stored in the HDD 205 is read out and displayed as the reference image. When a capture image button 602 is pressed, a control command may be transmitted to the NW camera 110 to request for image capturing. Then, in response to this request, the image captured by the NW camera 110 may be received and displayed as the reference image.

Next, a rectangle range is designated as a barcode scanning target by a user operation on an area designation area 603. Further, the type of a barcode to be scanned is input in the area designation area 603 by a user operation. The number of barcodes detected in the zoom image is input in an area 605 by a user operation. In an area 606, a dictionary that is used for comparison with a barcode scanning result to acquire a value is selected by a user operation. Every time the settings for barcode scanning are changed on the setting screen 600, the CPU 201 executes processing for scanning the barcode value from the reference image based on the settings. Further, the CPU 201 superimposes and displays a value 607 obtained by comparing the scanned barcode with the dictionary on the image in the area 610. In this way, the user can check whether various settings for barcode scanning are appropriate. With the processing as described above, the preparation processing is completed.

Figure 7:
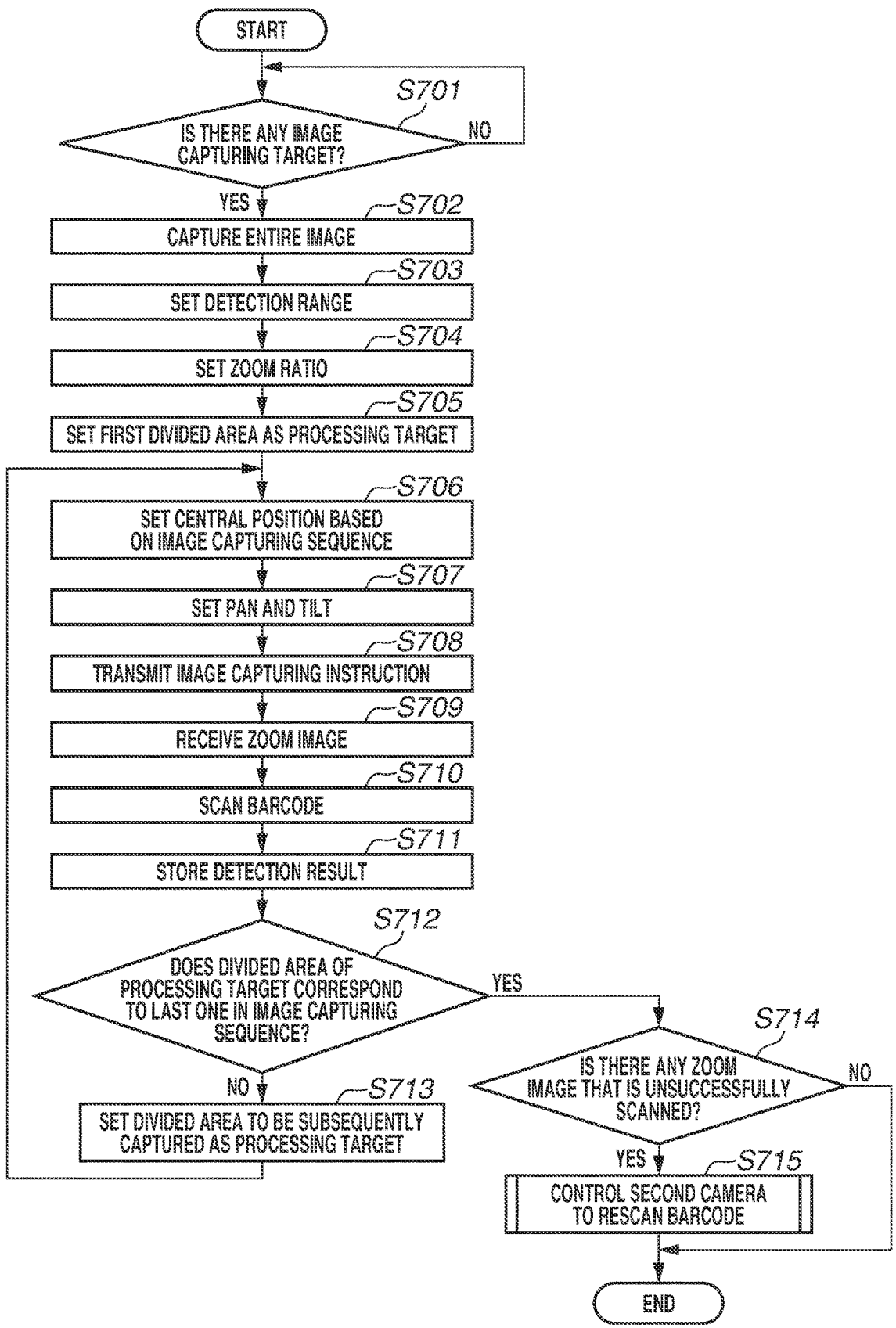
FIG. 7 is a flowchart illustrating a procedure of scanning processing.

FIG. 7 is a flowchart illustrating an example of a procedure of scanning processing. When each cargo is carried into the factory or the like, the sensor 150 detects the cargo and sends a notification indicating the detected cargo to the PLC 140. Upon receiving the notification from the sensor 150, the PLC 140 sends a predetermined notification indicating that the image capturing target is detected to the image processing apparatus 100.

In step S701, the CPU 201 of the image processing apparatus 100 stands by until a predetermined notification is received from the PLC 140. Upon receiving the predetermined notification from the PLC 140, the CPU 201 starts scanning processing.

In step S702, the CPU 201 generates a control command corresponding to the value set in the area 501 illustrated in FIG. 5, and transmits the control command to the NW camera 110. The NW camera 110 receives the control command from the image processing apparatus 100, and captures the entire image by performing pan/tilt/zoom operations according to settings indicated by the control command. Then, the CPU 201 receives the entire image from the NW camera 110.

In step S703, the CPU 201 performs image recognition processing on the entire image received in step S702, detects an area corresponding to the cargo, and compares coordinates of the area with coordinates of the detection range set in step S402. Based on the comparison result, the CPU 201 calculates a deviation between the position of the detection range in the entire image used for making a setting on the setting screen 500 illustrated in FIG. 5 and the position of the detection range in the entire image received in step S702. In this way, the position of the detection range that is slightly different depending on cargo or image capturing processing can be corrected. Information about the angle of the detection range may also be set in step S402 and a deviation in the angle of the detection range may be calculated and corrected.

Next, in step S704, the CPU 201 sets the zoom ratio input in the area 505 of the setting screen 500 illustrated in FIG. 5 as the zoom ratio in a zoom image capturing operation.

Next, in step S705, the CPU 201 sets a divisional area to be first captured in the image capturing sequence as a processing target.

Next, in step S706, the CPU 201 sets the central position in the zoom image capturing operation for the divisional area set as the processing target. When the central position is corrected based on the input in the area 504, the corrected central position is set.

Next, in step S707, the CPU 201 sets the image capturing range for the NW camera 110 to adjust pan and tilt according to the central position in the zoom image capturing operation set in step S706.

Next, in step S708, the CPU 201 generates a control command corresponding to the zoom ratio set in step S704 and the image capturing range set in step S707, and transmits the control command to the NW camera 110. The NW camera 110 receives the control command from the image processing apparatus 100, and performs image capturing processing by changing pan, tilt, and zoom according to settings indicated by the control command to acquire a zoom image, and transmits the zoom image to the image processing apparatus 100. The zoom ratio is not changed for the second and subsequent divisional areas. Accordingly, the NW camera 110 captures an image while changing the image capturing range only by adjusting pan and tilt.

In step S709, the CPU 201 receives the zoom image from the NW camera 110.

Next, in step S710, the CPU 201 scans a barcode from the zoom image received in step S709 based on information set on the setting screen 600 illustrated in FIG. 6. The CPU 201 loads the zoom image into the RAM 203, and detects edges from a range of a shape designated in the area designation area 603. Then, the CPU 201 determines that an area in which edges are regularly arranged with a predetermined length is a barcode, selects information indicating a correlation between an interval between edges and an output value based on the type of the barcode designated in the area 604, and scans the value of the barcode based on the interval between edges on the image. Assume that the information indicating the correspondence between the interval between edges and the output value associated with the type of each barcode is stored in the HDD 205.

Next, in step S711, the CPU 201 stores barcode scanning results in a storage unit such as the HDD 205.

FIG. 8 is a table illustrating an example of barcode scanning results stored in the storage unit such as the HDD 205.

In the table illustrated in FIG. 8, "ID" represents identification information about a record, and "counter" represents identification information about each zoom image. In the present exemplary embodiment, "counter" represents the number in the image capturing sequence of the divisional areas corresponding to the zoom image. In addition, "divisional image capturing coordinate" represents information indicating the central position of the zoom image. Specifically, "divisional image capturing coordinate" represents coordinates corresponding to the cross mark 513.

The term "layout information" refers to a barcode position on each cargo and is defined by the number of divisional areas set in the area 503. For example, layout information about a barcode x1 illustrated in FIG. 5 is represented by coordinate (0, 0), layout information about a barcode x2 is represented by coordinate (0, 1), layout information about a barcode x3 is represented by coordinate (0, 2), and layout information about a barcode x6 is represented by coordinate (1, 0).

The term "zoom range" refers to coordinates of a rectangle corresponding to the image capturing range 515 to be determined depending on the zoom ratio and the central position in the zoom image capturing operation. The "divisional image capturing coordinate" and "zoom range" are information indicating a position in the entire image. The term "detected number" refers to the number of barcodes detected in a zoom image. The term "detection No" refers to barcode identification information. In the present exemplary embodiment, the barcode identification information is uniquely given in the zoom image. However, the barcode identification information may be uniquely given in the detection range.

The term "central coordinate" refers to coordinates of the central position of a barcode. The "central coordinate" is information indicating a position in the zoom image. However, the "central coordinate" may indicate a value obtained by converting the position in the zoom image into the position in the entire image. The term "code angle" refers to an angle of an inclination with respect to the zoom image of the detected barcode. The "detected code" indicates code information detected as a result of comparing the scanned barcode with the dictionary. The term "reliability" refers to barcode recognition accuracy. In addition, determination results of "detected number determination", "dictionary matching determination", and "comprehensive determination" and "dictionary number" are stored. In the "comprehensive determination", for example, it is determined to be OK when the detected numbers are matched, the values preliminarily registered in the dictionary are also matched, and the reliability is more than or equal to a threshold. Assume that a determination criterion for the comprehensive determination can be arbitrarily set.

Next, in step S712, the CPU 201 determines whether the divisional area of the processing target is the last one in the image capturing sequence. If the divisional area is the last one in the image capturing sequence as a result of this determination (YES in step S712), the processing proceeds to step S714. On the other hand, if the divisional area is not the last one in the image capturing sequence (NO in step S712), the processing proceeds to step S713.

In step S713, the CPU 201 sets the divisional area to be subsequently captured in the image capturing sequence as the processing target, and then the processing returns to step S706. In this case, the central position in the zoom image capturing operation is changed in step S706 and the image capturing range is changed by adjusting pan and tilt again in step S707, and then an image capturing instruction is transmitted in step S708. In this case, the zoom ratio is not changed. Accordingly, an operation of, for example, zooming out once and then zooming in again is not carried out. For this reason, a processing time for driving the NW camera 110 to zoom an image can be reduced.

On the other hand, in step S714, the CPU 201 refers to the barcode scanning results illustrated in FIG. 8 and determines whether there is a zoom image from which a barcode is unsuccessfully scanned, i.e., whether image capturing has failed. For example, in the example illustrated in FIG. 12A, a person is present in front of the cargo A, and thus a part of the barcode cannot be scanned. As a result of this determination, if there is a zoom image from which a barcode is unsuccessfully scanned (YES in step S714), the processing proceeds to step S715. On the other hand, if there is no zoom image from which a barcode is unsuccessfully scanned (NO in step S714), the processing is terminated.

In step S715, the CPU 201 controls the other one of the NW camera 111 and the NW camera 112 installed in the factory to rescan the barcode that has not been successfully scanned. This processing will be described below with reference to FIGS. 9 to 11.

After the cargo A is carried into the factory or the like, a plurality of cargoes in which the number of packages is equal to that in the cargo A and the packages are stacked in the same manner as in the cargo A may be continuously carried into the factory or the like. In this case, there is no need to perform preparation processing for the second and subsequent cargoes. Upon receiving a notification indicating that cargoes have been carried into the factory or the like, the image processing apparatus 100 starts scanning processing. In this case, the scanning processing is executed using conditions set for the cargo A.

Results obtained by performing scanning processing are stored in the storage unit of the image processing apparatus 100, and the CPU 201 compares the results with the barcode information stored in the DB 120. However, a subject that performs the comparison processing is not limited to that described in the present exemplary embodiment. In another example, the DB 120 may perform the comparison processing. In this case, the scanning result obtained in the image processing apparatus 100 is transmitted to the DB 120 via the POE hub 130. Alternatively, the PLC 140 may perform the comparison processing. In this case, the scanning result is transmitted to the PLC 140 via the POE hub 130.

Figure 9:
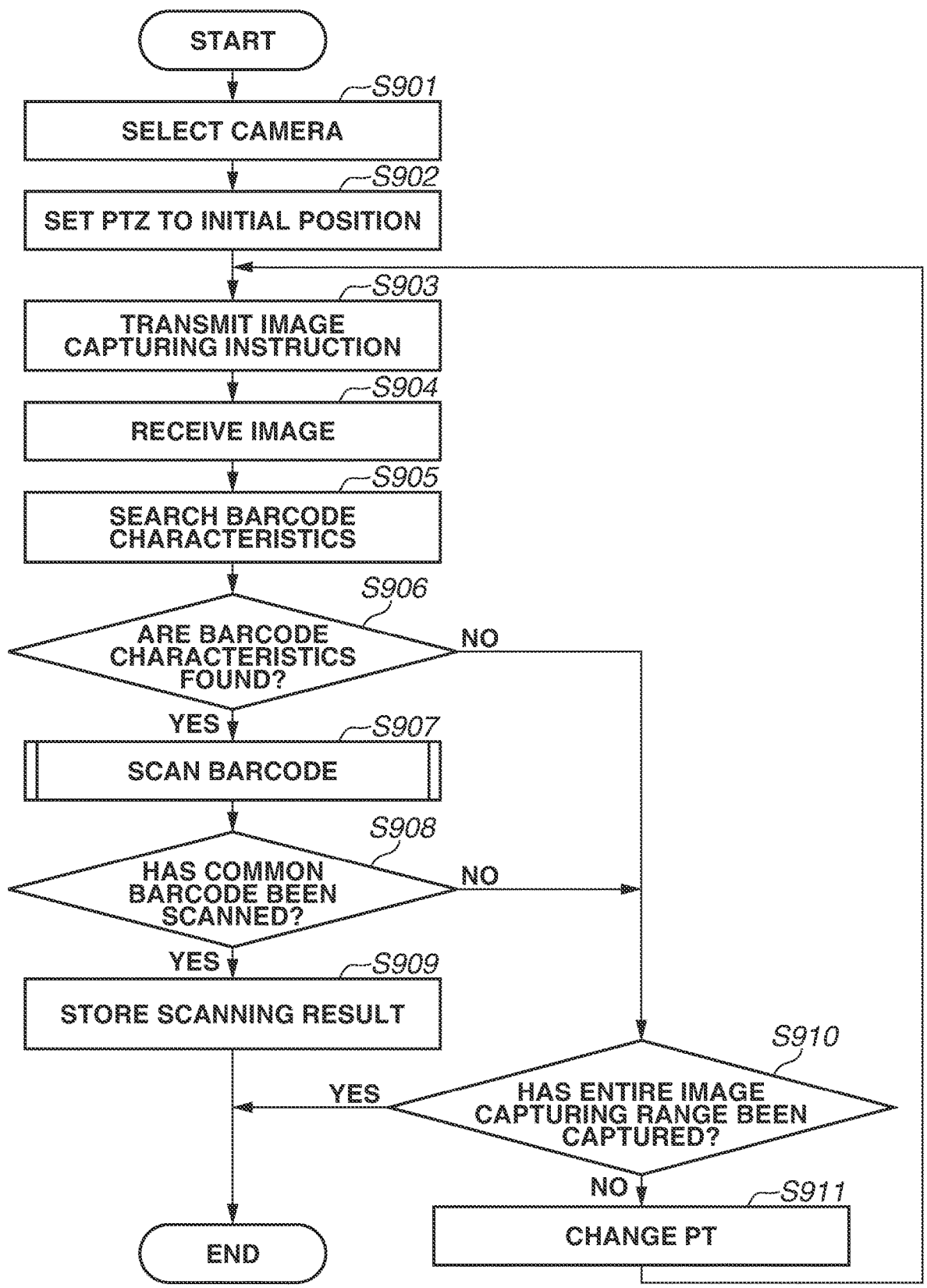
FIG. 9 is a flowchart illustrating an example of a detailed procedure of rescanning processing according to the first exemplary embodiment.

FIG. 9 is a flowchart illustrating an example of a detailed procedure of rescanning processing in step S715 illustrated in FIG. 7 according to the present exemplary embodiment.

In step S901, the CPU 201 selects a camera to be used for rescanning processing from one or more of the other NW cameras (i.e., the NW camera 111 and the NW camera 112 in the present exemplary embodiment) that can be controlled by the CPU 201. In this case, the CPU 201 may randomly select any NW camera. If one NW camera is selected to attempt rescanning processing and the rescanning processing fails, another NW camera may be selected to attempt rescanning again. Alternatively, a plurality of NW cameras may be selected to attempt rescanning processing in parallel from images captured by the selected NW cameras, and when rescanning from images captured by any one of the NW cameras is successful, rescanning processing from the images captured by the other NW cameras may be interrupted and the processing may be terminated. More alternatively, if any one of the NW cameras is performing image capturing for processing with a higher degree of importance than rescanning processing, the other NW cameras may be preferentially selected.

In step S902, the CPU 201 generates a control command to set pan, tilt, and zoom for the selected NW camera to a prescribed initial position, and transmits the control command to the selected NW camera. The selected NW camera receives the control command from the image processing apparatus 100, and changes pan, tilt, and zoom according to settings indicated by the control command.

In step S903, the CPU 201 transmits an image capturing instruction to the selected NW camera. The selected NW camera receives the image capturing instruction from the image processing apparatus 100, performs image capturing processing in response to the image capturing instruction, and transmits the captured image to the image processing apparatus 100.

In step S904, the CPU 201 receives the image captured by the selected NW camera. FIG. 12B illustrates an example of the image that is captured by the selected NW camera and is received in image acquisition processing of step S904.

In step S905, the CPU 201 searches for barcode characteristics from the received image. In the search for barcode characteristics, barcode characteristics included in the zoom image received in step S709 may be used, or the barcode characteristics recorded on the HDD 205 together with programs may be loaded into the RAM 203 and the loaded barcode characteristics may be used.

In step S906, the CPU 201 determines whether barcode characteristics are found. If barcode characteristics are found as a result of this determination (YES in step S906), the processing proceeds to step S907. If barcode characteristics are not found (NO in step S906), the processing proceeds to step S910.

In step S907, the CPU 201 executes barcode scanning processing (data acquisition processing). This processing will be described in detail below with reference to a flowchart illustrated in FIG. 10.

In step S908, the CPU 201 compares the value of the barcode scanned from the image captured by the selected NW camera with the value of the barcode scanned from the image captured by the NW camera 110, and determines whether a common barcode has been scanned based on the comparison result. This determination is made to check whether the barcode on the cargo A is scanned from the image captured by the selected NW camera. In the present exemplary embodiment, if at least one common barcode is scanned by both the selected NW camera and the NW camera 110, the CPU 201 determines that the common barcode has been scanned. If the common barcode has been scanned as a result of this determination (YES in step S908), the processing proceeds to step S909. If the common barcode has not been scanned (NO in step S908), the processing proceeds to step S910.

In step S909, the CPU 201 acquires a value obtained by scanning a barcode located at the position corresponding to the barcode that has not been successfully scanned from the image captured by the NW camera 110 among the barcodes scanned from the image captured by the selected NW camera based on the position of the common barcode, and stores the acquired value in the storage unit such as the HDD 205. Then, the processing is terminated. Thus, information about the barcode that has not been successfully scanned from the image captured by the NW camera 110 is supplemented with information about the barcode scanned from the image captured by the selected NW camera.

In step S910, the CPU 201 determines whether the selected NW camera has captured the image of the entire image capturing range. If the image of the entire image capturing range has been captured as a result of this determination (YES in step S910), the processing is terminated. On the other hand, if the image of the entire image capturing range has not been captured (NO in step S910), the processing proceeds to step S911.

In step S911, the CPU 201 generates a control command to control pan and tilt for the NW camera so as to capture the image of the subsequent image capturing range, and transmits the control command to the NW camera. Then, the processing returns to step S903.

FIG. 10 is a flowchart illustrating an example of a detailed procedure of barcode scanning processing in step S907 illustrated in FIG. 9.

First, in step S1001, the CPU 201 performs processing for determining whether correction of pan, tilt, and zoom for the selected NW camera is required. For example, if an image illustrated in FIG. 12C is received in step S904, the image of the cargo A is captured, but the barcode that has not been successfully scanned (e.g., a lower left barcode) by the NW camera 110 falls out of the image capturing range. In this case, correction of pan, tilt, and zoom is required so that the lower left barcode can be set within the angle of view. A specific determination method will be described below with reference to a flowchart illustrated in FIG. 11.

In step S1002, the CPU 201 determines whether correction of pan, tilt, and zoom is required as a result of processing in step S1001. If correction of pan, tilt, and zoom is required as a result of this determination (YES in step S1002), the processing proceeds to step S1003. On the other hand, if correction of pan, tilt, and zoom is not required (NO in step S1002), the processing proceeds to step S1006.

In step S1003, the CPU 201 generates a control command to control pan and tilt for the selected NW camera in the direction of the barcode that has not been successfully scanned from the image captured by the NW camera 110, and transmits the control command to the selected NW camera. Alternatively, the CPU 201 generates a control command to perform an operation of zooming out to a small extent and then zooming the barcode that has not been successfully scanned by the NW camera 110 to be set within the angle of view, and transmits the control command to the selected NW camera. The selected NW camera receives the control command from the image processing apparatus 100, and changes pan, tilt, or zoom according to settings indicated by the control command.

In step S1004, the CPU 201 transmits an image capturing instruction to the selected NW camera. The selected NW camera receives the image capturing instruction from the image processing apparatus 100, performs image capturing processing in response to the image capturing instruction, and transmits the captured image to the image processing apparatus 100.

In step S1005, the CPU 201 receives the image captured by the selected NW camera.

Steps S1006 to S1011 are executed in a loop and the loop is repeated by the number of times corresponding to the number of barcode characteristics included in the image received in step S904 or step S1005.

In step S1007, the CPU 201 generates a control command to capture an image by zooming in on the position of each barcode characteristic to be treated in the loop, and transmits the control command to the selected NW camera. The selected NW camera receives the control command from the image processing apparatus 100, and changes zoom or the like according to settings indicated by the control command.

In step S1008, the CPU 201 transmits an image capturing instruction to the selected NW camera. The selected NW camera receives the image capturing instruction from the image processing apparatus 100, performs image capturing processing in response to the image capturing instruction, and transmits the captured zoom image to the image processing apparatus 100.

In step S1009, the CPU 201 receives the zoom image captured by the selected NW camera.

In step S1010, the CPU 201 scans each barcode from the zoom image. In this case, the barcode may be scanned by performing projective transformation or perspective transformation on the zoom image, as needed. The processing of steps S1006 to S1011 is repeated for all barcode characteristics as described above, and then the processing is terminated.

FIG. 11 is a flowchart illustrating an example of a detailed processing procedure of step S1001 illustrated in FIG. 10. First, in step S1101, the CPU 201 selects any one of a plurality of barcode characteristics included in the image received in step S904, and calculates coordinates of the selected barcode characteristics.

In step S1102, the CPU 201 generates a control command to capture an image by zooming in on the selected barcode characteristics, and transmits the control command to the selected NW camera. The selected NW camera receives the control command from the image processing apparatus 100, and changes zoom or the like according to settings indicated by the control command.

In step S1103, the CPU 201 transmits an image capturing instruction to the selected NW camera. The selected NW camera receives the image capturing instruction from the image processing apparatus 100, performs image capturing processing in response to the image capturing instruction, and transmits the captured zoom image to the image processing apparatus 100.

In step S1104, the CPU 201 receives the image captured by the selected NW camera. In step S1105, the CPU 201 scans each barcode from the zoom image. In this case, the barcode may be scanned by performing projective transformation or perspective transformation on the zoom image, as needed.

In step S1106, the CPU 201 acquires layout information about the barcode scanned in step S1105 from the barcode scanning results illustrated in FIG. 8.

In step S1107, the CPU 201 determines whether correction of pan, tilt, and zoom is required based on the position in the image including the barcode characteristics calculated in step S1101 and the layout information acquired in step S1105. For example, layout information about a barcode 1201 is represented by (2, 0), and the barcode 1201 is located on an upper portion of the cargo A. However, coordinates of the barcode 1201 included in the image illustrated in FIG. 12C are located below the image. The coordinates of the barcode 1201 are calculated in step S1101. Accordingly, the CPU 201 determines that the image of the barcode that is supposed to be located below the barcode 1201 is not captured, and thus determines that correction of pan, tilt, and zoom is required.

According to the present exemplary embodiment, in step S908, it is determined that the common barcode has been scanned if at least one common barcode is captured by both the selected NW camera and the NW camera 110. However, in order to prevent an image of another cargo from being erroneously captured, stricter determination conditions may be set. For example, if a prescribed number or more of identical barcodes are captured, it may be determined that the common barcode has been scanned. If a prescribed number of identical barcodes are captured and the layouts of the barcodes are matched, it may be determined that the common barcode has been scanned.

As described above, according to the present exemplary embodiment, each cargo in which a plurality of barcodes is regularly arranged according to a matrix pattern can be set as a processing target, and the positions of the plurality of barcodes attached to the packages of the cargo can be collectively identified. Based on the identified positions, a plurality of zoom images can be continuously captured only by adjusting pan and tilt, without the need for changing the zoom ratio. In addition, even if scanning of a barcode with one camera fails, another camera can be controlled to capture an image for rescanning, so that the barcode can be scanned.

In the image processing system described in the first exemplary embodiment, if scanning of a barcode from an image captured by the NW camera 110 has failed, another NW camera that can be controlled by the CPU 201 is selected to attempt rescanning. Accordingly, there is a possibility that an NW camera located at a position where the image of the cargo A cannot be captured, such as an NW camera located at a position away from the cargo A, or an NW camera installed at a position where the cargo A is out of sight may be selected. However, since the NW cameras are originally intended to, for example, monitor the inside of the factory, it is not desirable to select the NW camera that is clearly incapable of capturing an image of the cargo A and to wastefully use the NW camera to execute processing for barcode rescanning.

Accordingly, an image processing system according to a second exemplary embodiment records history information indicating whether each NW camera has successfully scanned data from a captured image. When a main NW camera unsuccessfully scans data from the captured image, the NW camera that has captured the image which has been successfully scanned is preferentially selected with reference to the history information. The configuration of the image processing system according to the second exemplary embodiment and the processing procedure of the image processing apparatus 100 according to the second exemplary embodiment are basically similar to those of the first exemplary embodiment, and thus the descriptions thereof are omitted. Only differences between the second exemplary embodiment and the first exemplary embodiment will be described below.

FIG. 13 is a table illustrating an example of history information associated with scanning images captured by other cameras when the NW camera 110 has failed in scanning. The history information is stored in the storage unit such as the HDD 205.

As illustrated in FIG. 13, "date and time" represents a date and time when the CPU 201 starts controlling each NW camera, "camera ID" represents an identification (ID) for identifying each NW camera, "scanning result" represents a result of scanning from an image captured by each NW camera, "successful" indicates that scanning is successful, "failed" indicates that scanning has failed after the entire capturing range is searched by each NW camera, "interrupted" indicates that a scanning operation is interrupted because scanning of an image by other NW cameras that have simultaneously attempted barcode scanning is successful, and "pan", "tilt", and "zoom" each represent the image capturing position of each NW camera where the NW camera has successfully scanned data from the captured image.

When the NW camera is selected in step S901 illustrated in FIG. 9, the CPU 201 adds a new row to the history information and also adds information to "date and time" and "camera ID". Further, the CPU 201 stores the scanning result in the storage unit such as the HDD 205 in step S909, and then records "successful" on "scanning result" in the history information illustrated in FIG. 13. In addition, positional information about the NW camera when the image capturing instruction is transmitted to the NW camera in step S903 or step S1004 is recorded on "pan", "tilt", and "zoom" in the history information. Further, if the CPU 201 determines that the image of the entire image capturing range has been captured in step S910, "failed" is recorded on "scanning result" in the history information. When the scanning operation is interrupted, the CPU 201 records "interrupted" on "scanning result" in the history information. In the present exemplary embodiment, the history information is updated by the above-described procedure.

Further, the CPU 201 refers to the history information in reverse chronological order when the NW camera is selected in step S901. Then, the CPU 201 preferentially selects the NW camera with "scanning result" indicating "successful" or "interrupted". In the case of generating the control command to set pan, tilt, and zoom to the prescribed initial position in step S902, the image capturing position recorded on "pan", "tilt", and "zoom" in the history information is reproduced.

As described above, according to the present exemplary embodiment, when scanning a barcode from the image captured by the NW camera 110 has failed, the other NW cameras can be efficiently selected for rescanning. This prevents selection of NW cameras that cannot capture an image of a cargo.

A third exemplary embodiment illustrates a method for performing rescanning processing in a procedure different from those of the first and second exemplary embodiments when scanning a barcode from the image captured by the main NW camera has failed. The configuration of an image processing system according to the third exemplary embodiment is similar to the configuration of the image processing system according to the first exemplary embodiment, and thus the descriptions thereof are omitted. The preparation processing performed by the image processing apparatus 100 and the procedure of scanning a barcode from the image captured by the NW camera 110 are also similar to those illustrated in FIG. 4 and FIG. 7, respectively, and thus the descriptions thereof are omitted. Only differences between the third exemplary embodiment and the first exemplary embodiment will be described below.

Figure 14:
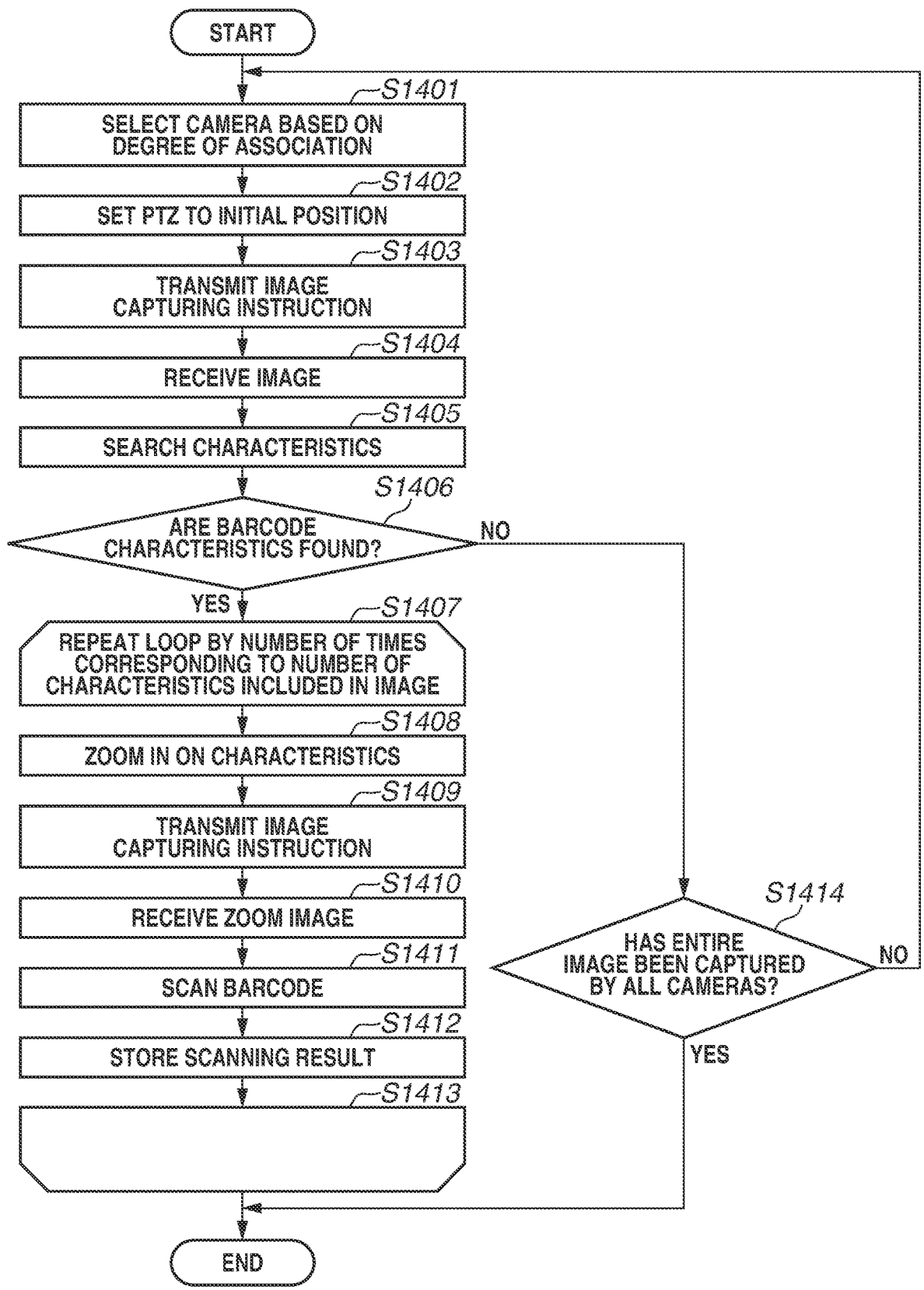
FIG. 14 is a flowchart illustrating an example of a detailed procedure of rescanning processing according to a third exemplary embodiment.

FIG. 14 is a flowchart illustrating an example of a detailed procedure of rescanning processing in step S715 illustrated in FIG. 7 according to the present exemplary embodiment.

In step S1401, the CPU 201 selects a camera to be used for rescanning processing based on a degree of association, which is set for each NW camera in advance, from the controllable NW cameras (i.e., the NW camera 111 and the NW camera 112 in the present exemplary embodiment) except the NW camera 110.

The term "degree of association" used herein refers to a value indicating whether the image of the barcode on the cargo A captured by the NW camera 110 can be clearly captured by each NW camera. In other words, the degree of association is a parameter based on an image capturing state. For example, an NW camera with a high resolution, an NW camera capable of capturing an image of a barcode from a location close to the front side, and an NW camera capable of capturing an enlarged image of a barcode within the angle of view have a high degree of association. Even when the barcode is rescanned by the NW camera whose image capturing direction is close to that of the NW camera 110, the image in which the barcode is hidden is captured in the same manner as in the NW camera 110 due to the image capturing direction of the NW camera 110. Therefore, the degree of association for the NW camera may be lowered.

Information about the degree of association between the NW camera 110 and the other cameras is preliminarily stored in the storage unit such as the HDD 205, and the information about the degree of association is acquired from the storage unit in processing of step S1401. The user can set the degree of association for each NW camera from the image processing apparatus 100 via the input device 206. Further, the user may input, via the input device 206, information, such as the position and height of each NW camera, pan and tilt ranges for image capturing, and a maximum zoom ration, while viewing the floor plan of the factory, so that the CPU 201 can calculate the degree of association based on these pieces of information.

In the case of selecting an NW camera, the CPU 201 may select an NW camera in a descending order of the degree of association, or may arbitrarily select an NW camera with the degree of association that exceeds a default threshold. Further, the CPU 201 may prevent selection of an NW camera that is performing specific image capturing processing with a high degree of importance, such as capturing of an image of a suspicious figure. Further, if there is an NW camera that is to be devoted to monitoring in a specific time zone (e.g., night time) or on a specific day of a week (e.g., holiday), the priority level for the camera to be selected may be changed depending on the time or the day of the week when an image is captured so as to prevent selection of a specific NW camera.

Processes of steps S1402 to S1405 are respectively similar to processes of steps S902 to S905 illustrated in FIG. 9, and thus the descriptions thereof are omitted.

In step S1406, the CPU 201 determines whether barcode characteristics are found. If barcode characteristics are found as a result of this determination (YES in step S1406), the processing proceeds to step S1407. If barcode characteristics are not found (NO in step S1406), the processing proceeds to step S1414.

Steps S1407 to S1413 are executed in a loop and the loop is repeated by the number of times corresponding to the number of barcode characteristics detected in step S1405. Processes of steps S1408 to S1411 are respectively similar to processes of steps S1007 to 1010 illustrated in FIG. 10, and thus the descriptions thereof are omitted.

In step S1412, the CPU 201 stores information about the scanned barcode in the storage unit such as the HDD 205. After the processing of steps S1407 to S1413 is repeated by the number of times corresponding to the number of barcode characteristics detected in step S1405, the CPU 201 terminates the processing. Information about the barcode that has not been successfully scanned from the image captured by the NW camera 110 is supplemented with information about the barcode scanned from the image captured by the selected NW camera.

In step S1414, the CPU 201 determines whether the image of the entire image capturing range has been captured by the selected NW camera. If the image of the entire image capturing range has been captured as a result of this determination (YES in step S1414), the processing is terminated. On the other hand, if the image of the entire image capturing range has not been captured (NO in step S1414), the processing returns to step S1401 and the next NW camera is selected to execute the subsequent processing.

In the processing illustrated in FIG. 14, NW cameras other than the NW camera 110 capture images by zooming in on all barcode characteristics detected in step S1405, and rescan the barcodes. In this case, however, the barcodes scanned from the image captured by the NW camera 110 are also set as rescanning targets, which leads to an increase in processing time. For this reason, rescanning processing is executed only on the barcode that has not been successfully scanned by the NW camera 110 with reference to the layout information included in the barcode scanning results illustrated in FIG. 8.

Figure 12A:
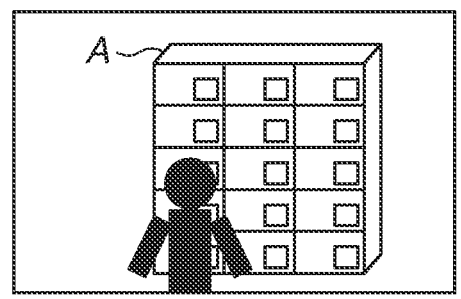
FIGS. 12A, 12B, and 12C illustrate examples of an image captured by the NW camera.
Figure 12B:
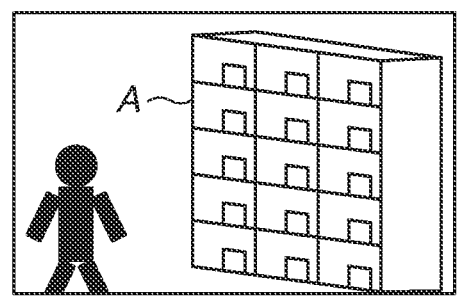
Figure 12C:
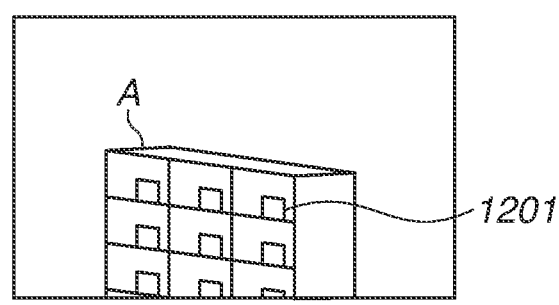

For example, in the example illustrated in FIG. 12A, the CPU 201 can determine that the barcodes with layout information represented by (0, 2), (0, 3), and (0, 4) has not been successfully scanned in the image captured by the NW camera 110. Accordingly, in the loop of steps S1407 to S1413, the CPU 201 may transmit the image capturing instruction to capture an image by zooming in only on the barcodes with the layout information represented by (0, 2), (0, 3), and (0, 4) from the entire image that is captured from a direction as illustrated in FIG. 12B.

Further, in the processing illustrated in FIG. 14, the CPU 201 executes processing in which one NW camera is selected to attempt rescanning, and if rescanning fails, another NW camera is selected for rescanning. As a method other than the above-described method, a plurality of NW cameras may be selected to attempt rescanning a barcode in parallel from images captured by the selected NW cameras, and when rescanning the barcode from the image captured by any one of the NW cameras is successful, processing of rescanning the barcode from the images captured by the other NW cameras may be interrupted.

As described above, according to the present exemplary embodiment, when scanning a barcode fails, another NW camera is selected based on the degree of association, so that the barcode can be efficiently scanned.

In the third exemplary embodiment, the user needs to set the degree of association for each NW camera and to input the position and the like of each NW camera. However, if a large number of NW cameras are installed in the factory, it is troublesome for the user to set the degrees of association by the above-described methods. Accordingly, a fourth exemplary embodiment illustrates a method for setting the degree of association for each NW camera by image processing. The configuration of an image processing system according to the fourth exemplary embodiment and the processing procedure of the image processing apparatus 100 according to the fourth exemplary embodiment are basically similar to those of the third exemplary embodiment, and thus the descriptions thereof are omitted. Only differences between the fourth exemplary embodiment and the third exemplary embodiment will be described below.

Figure 15:
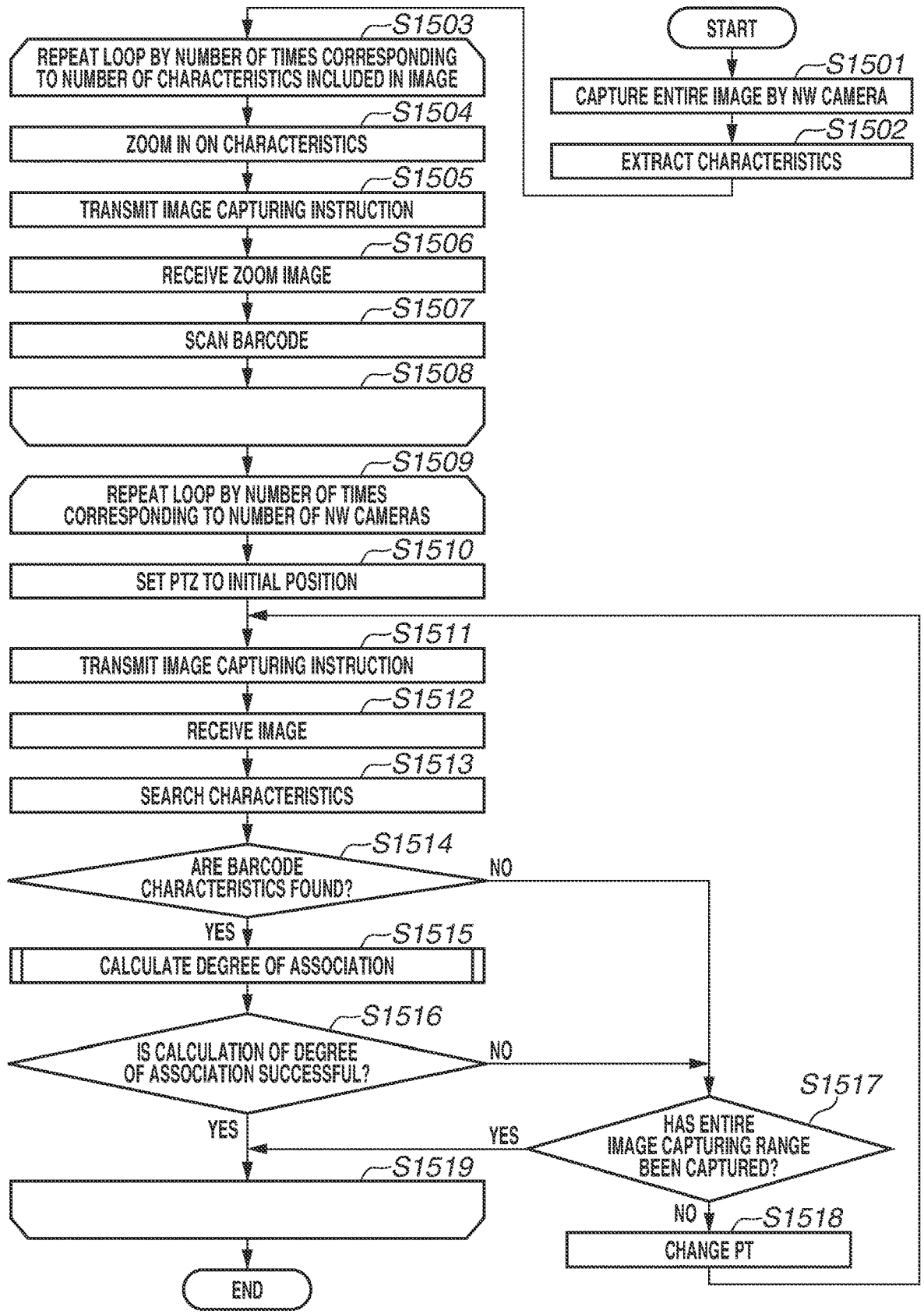
FIG. 15 is a flowchart illustrating an example of a procedure of processing for setting a degree of association of each NW camera according to a fourth exemplary embodiment.

FIG. 15 is a flowchart illustrating an example of a procedure of processing for setting the degree of association for each NW camera. Assume that the setting processing illustrated in FIG. 15 is executed under conditions that the image of the cargo A can be reliably captured without any access from a worker or the like, for example, during initial system introduction or layout change.

In step S1501, the CPU 201 generates a control command to capture the entire image of the cargo A, and transmits the control command to the NW camera 110. The NW camera 110 receives the control command from the image processing apparatus 100, and captures the entire image by performing pan/tilt/zoom operations according to settings indicated by the control command. Then, the CPU 201 receives the entire image from the NW camera 110. The control command for pan, tilt, and zoom of the NW camera 110 is generated based on, for example, the value set in the area 501 illustrated in FIG. 5, like in the first exemplary embodiment.

In step S1502, the CPU 201 extracts characteristics of each barcode from the entire image. As a method for extracting barcode characteristics from the entire image, barcode characteristics may be extracted by image recognition processing like that in step S703 illustrated in FIG. 7, or a barcode area may be extracted by the user. In this case, for example, the entire image is displayed in the area 510 illustrated in FIG. 5, and the user is caused to select a barcode area via the input device 206 so as to extract characteristics of the area. Further, the barcode area may be detected by template matching from the entire image so as to extract characteristics of the barcode area.

Steps S1503 to S1508 are executed in a loop and the loop is repeated by the number of times corresponding to the number of barcode characteristics extracted in step S1502.

In step S1504, the CPU 201 generates a control command to capture an image by zooming in on the position of each barcode characteristic to be treated in the loop, and transmits the control command to the NW camera 110. The NW camera 110 receives the control command from the image processing apparatus 100, and changes zoom or the like according to settings indicated by the control command.

In step S1505, the CPU 201 transmits an image capturing instruction to the NW camera 110. The NW camera 110 receives the image capturing instruction from the image processing apparatus 100, performs image capturing processing in response to the image capturing instruction, and transmits the captured zoom image to the image processing apparatus 100.

In step S1506, the CPU 201 receives the zoom image captured by the NW camera 110.

In step S1507, the CPU 201 scans each barcode from the zoom image. In this case, the barcode may be scanned by performing projective transformation or perspective transformation on the zoom image, as needed. As described above, after the processing of steps S1503 to S1508 is repeated by the number of times corresponding to the number of barcode characteristics, the processing proceeds to step S1509.

Steps S1509 to S1519 are executed in a loop and the loop is repeated by the number of times corresponding to the number of NW cameras (i.e., the NW camera 111 and the NW camera 112 in the present exemplary embodiment) that can be controlled by the image processing apparatus 100.

In step S1510, the CPU 201 generates a control command to set pan, tilt, and zoom for the NW camera for which the loop is repeated to the prescribed initial position, and transmits the control command to the target NW camera. The target NW camera receives the control command from the image processing apparatus 100, and changes pan, tilt, and zoom according to settings indicated by the control command.

In step S1511, the CPU 201 transmits an image capturing instruction to the target NW camera. The target NW camera receives the image capturing instruction from the image processing apparatus 100, performs image capturing processing in response to the image capturing instruction, and transmits the captured image to the image processing apparatus 100.

In step S1512, the CPU 201 receives the image captured by the target NW camera. In step S1513, the CPU 201 searches for barcode characteristics detected in step S1502 from the image received in step S1512.

In step S1514, the CPU 201 determines whether all barcode characteristics detected in step S1502 are found. If all barcode characteristics are found as a result of this determination (YES in step S1514), the processing proceeds to step S1515. If not all the barcode characteristics are found (NO in step S1514), the processing proceeds to step S1517.

In step S1515, the CPU 201 executes processing of calculating a degree of association. This processing will be described in detail below with reference to a flowchart illustrated in FIG. 16.

In step S1516, the CPU 201 determines whether the calculation of the degree of association is successful as a result of processing in step S1515. If the calculation of the degree of association is successful as a result of this determination (YES in step S1516), the processing proceeds to step S1519 and then the loop for the NW camera is terminated. On the other hand, if the calculation of the degree of association has failed (NO in step S1516), the processing proceeds to step S1517.

In step S1517, the CPU 201 determines whether the image of the entire image capturing range has been captured by the target NW camera. If the image of the entire image capturing range has been captured as a result of this determination (YES in step S1517), the processing proceeds to step S1519 and then the loop for the NW camera is terminated. On the other hand, the image of the entire image capturing range has not been captured (NO in step S1517), the processing proceeds to step S1518.

In step S1518, the CPU 201 generates a control command to capture an image at the subsequent image capturing position, and transmits the control command to the target NW camera. Then, the processing returns to step S1511. The target NW camera receives the control command from the image processing apparatus 100, and changes pan, tilt, and zoom according to settings indicated by the control command After the loop of steps S1509 to S1519 for all NW cameras is terminated as described above, the processing is terminated.

Figure 16:
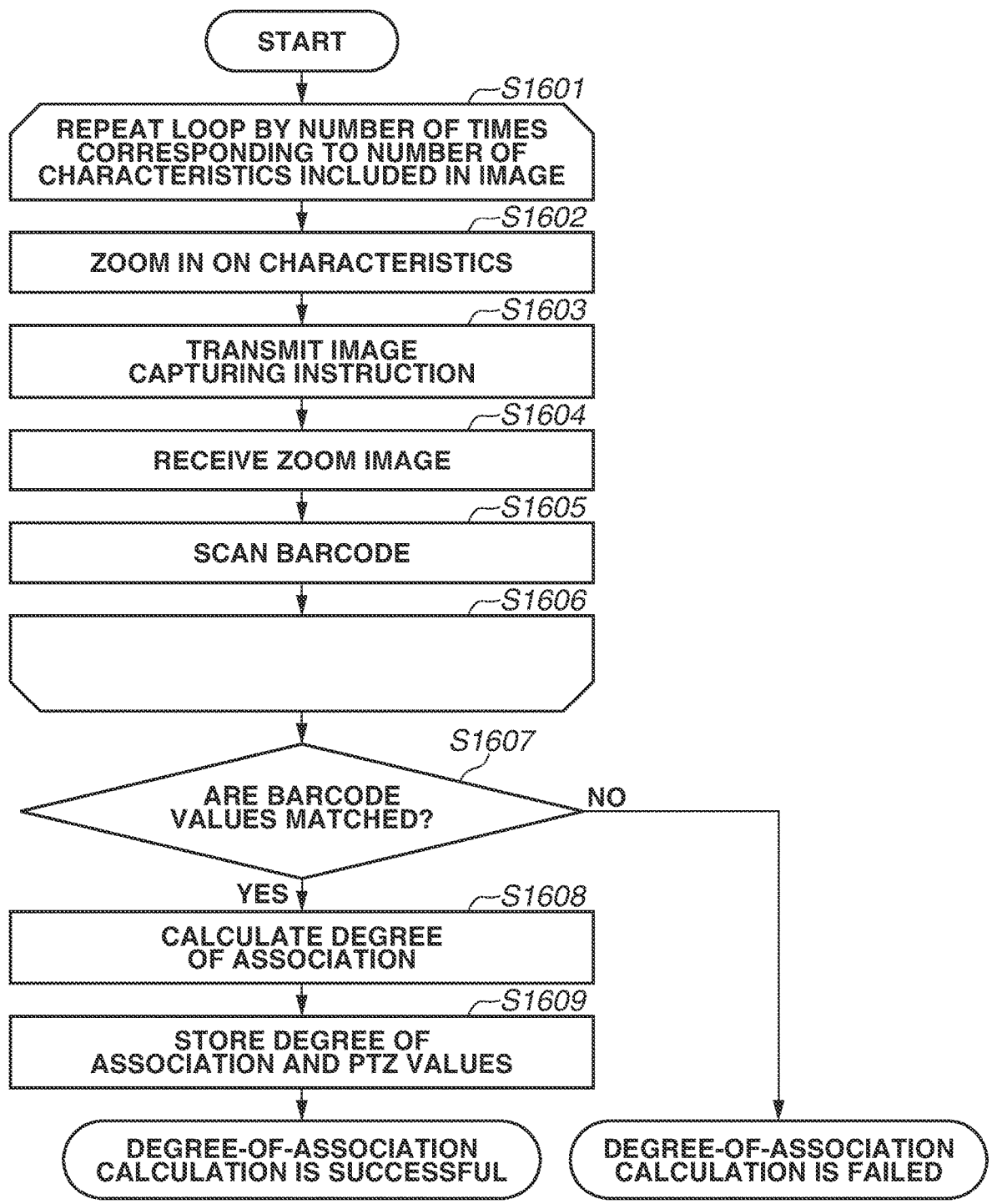
FIG. 16 is a flowchart illustrating an example of a detailed procedure of processing of calculating a degree of association according to the fourth exemplary embodiment.

FIG. 16 is a flowchart illustrating an example of a detailed procedure of processing of calculating a degree of association in step S1509 illustrated in FIG. 15.

Steps S1601 to S1606 are executed in a loop and the loop is repeated by the number of times corresponding to the number of barcode characteristics extracted in step S1502.

In step S1602, the CPU 201 generates a control command to capture an image by zooming in on the position of each barcode characteristic to be treated in the loop, and transmits the control command to the target NW camera for which the loop of steps S1509 to S1519 illustrated in FIG. 15 is executed. The target NW camera receives the control command from the image processing apparatus 100, and changes zoom or the like according to settings indicated by the control command.

In step S1603, the CPU 201 transmits an image capturing instruction to the target NW camera. The target NW camera receives the image capturing instruction from the image processing apparatus 100, performs image capturing processing in response to the image capturing instruction, and transmits the captured zoom image to the image processing apparatus 100.

In step S1604, the CPU 201 receives the zoom image captured by the target NW camera.

In step S1605, the CPU 201 scans each barcode from the zoom image. In this case, the barcode may be scanned by performing projective transformation or perspective transformation on the zoom image, as needed. After the loop of steps S1601 to S1606 for all barcode characteristics is terminated as described above, the processing proceeds to step S1607.

In step S1607, the CPU 201 compares the value of each barcode scanned from the zoom image captured by the NW camera 110 in step S1507 with the value of each barcode scanned from the zoom image captured by the other NW cameras in step S1605. If the values of some of the barcodes are not matched as a result of this comparison, it is determined that the target NW camera has captured the image of a cargo other than the cargo A, and it is also determined that the calculation of the degree of association has failed, and thus the processing is terminated. On the other hand, if all the barcode values are matched, the processing proceeds to step S1608.

In step S1608, the CPU 201 calculates the degree of association using the number of pixels of each camera, the ratio of the area of each barcode within the angle of view, and the degree of deformation of each barcode as parameters.

In step S1609, the CPU 201 stores the degree of association calculated in step S1608 and the pan, tilt, and zoom values obtained when the image capturing instruction is transmitted in step S1511 in the storage unit such as the HDD 205. The stored degree of association is used for processing of step S1401 illustrated in FIG. 14, and the pan, tilt, and zoom values are used for processing of step S1402 illustrated in FIG. 14.

As described above, according to the present exemplary embodiment, when scanning a barcode has failed and another NW camera is selected, the NW camera can be selected based on the degree of association determined based on the difference between scanning results. Consequently, another NW camera can be more appropriately selected and information about the barcode that has not been successfully scanned can be scanned from the image captured by the selected NW camera.

The present disclosure includes exemplary embodiments. However, the present disclosure is not limited to these specific exemplary embodiments, and various modes can be implemented without departing from the gist of the disclosure. Some of the above-described exemplary embodiments may be combined as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-202220, filed Nov. 7, 2019, which is hereby incorporated by reference herein in its entirety.

What is claimed is:

1. An image processing apparatus comprising:
one or more processors; and
at least one memory storing executable instructions which, when executed by the one or more processors, cause the image processing apparatus to:
scan first code from a first image captured by a first camera;
acquire a second image captured by a second camera different from the first camera in a case where a piece of the first code has not been successfully scanned from the first image;
scan second code from the second image;
compare the first code scanned from the first image with the second code scanned from the second image; and
acquire at least a piece of the second code scanned from the second image instead of a piece of the first code that has not been successfully scanned from the first image in a case where the first code scanned from the first image and the second code scanned from the second image are at least partially same as a result of the comparison.

2. The image processing apparatus according to claim 1, wherein the executable instructions, when executed by the one or more processors, further cause the image processing apparatus to acquire code position information of each piece of code by scanning image, and control the second camera to change an image capturing range based on a result of comparison between the code position information of the same code in the first code and the code position information of the same code in the second code.

3. The image processing apparatus according to claim 1, wherein the executable instructions, when executed by the one or more processors, further cause the image processing apparatus to acquire code position information of each piece of code by scanning image, and
wherein code position information of the same code in the first code are matched as the code position information of the same code in the second code.

4. The image processing apparatus according to claim 1, wherein the executable instructions, when executed by the one or more processors, further cause the image processing apparatus to select one of a plurality of cameras different from the first camera as the second camera in a case where there is a plurality of cameras other than the first camera, in a case where a piece of the first code has not been successfully scanned from the first image.

5. The image processing apparatus according to claim 4, wherein the executable instructions, when executed by the one or more processors, further cause the image processing apparatus to store, as history information, a result of scanning images captured by the plurality of cameras, and
wherein the second camera is selected from the plurality of cameras based on the history information.

6. The image processing apparatus according to claim 1, wherein the data is one of a barcode, a two-dimensional code, Chameleon Code®, a number, a character, a symbol, and a figure.

7. An image processing apparatus comprising:
one or more processors; and
at least one memory storing executable instructions which, when executed by the one or more processors, cause the image processing apparatus to:
scan first code from a first image captured by a first camera;
acquire an image capturing state in a case where image is captured by a plurality of cameras other than the first camera;
select a second camera from the plurality of cameras based on the image capturing state in a case where a piece of the first code has not been successfully scanned from the first image;
acquire a second image captured by the second camera;
scan second code from the second image; and
acquire a piece of the second code scanned from the second image instead of the piece of the first code that has not been successfully scanned from the first image.

8. The image processing apparatus according to claim 7, wherein the image capturing state includes one of a resolution, an image capturing direction, and a size of an image capturing target.

9. The image processing apparatus according to claim 7, wherein the image capturing state includes a relationship with an image capturing direction of the first camera.

10. The image processing apparatus according to claim 7, wherein the second camera is selected based on a priority level of a camera depending on one of an image-capturing time and an image-capturing day of a week.

11. The image processing apparatus according to claim 7, wherein the second camera is not selected, from the plurality of cameras, a camera that is performing a specific image capturing operation.

12. The image processing apparatus according to claim 7, wherein the image capturing state is acquired based on an input by a user from an operation unit.

13. The image processing apparatus according to claim 7, wherein the image capturing state is acquired based on a result of scanning the first image and a result of scanning the second image.

14. The image processing apparatus according to claim 7, wherein the data is one of a barcode, a two-dimensional code, Chameleon Code®, a number, a character, a symbol, and a figure.

15. An image processing method comprising:
scanning first code from a first image captured by a first camera;
acquiring a second image captured by a second camera different from the first camera in a case where a piece of the first code has not been successfully scanned from the first image;
scanning second code from the second image;
comparing the first code scanned from the first image with the second code scanned from the second image; and
acquiring at least a piece of the second code scanned from the second image instead of a piece of the first code that has not been successfully scanned from the first image in a case where the first code scanned from the first image and the second code scanned from the second image are at least partially same as a result of the comparison.

16. A non-transitory computer-readable storage medium storing executable instructions, which when executed by one or more processors of an image processing apparatus, cause the image processing apparatus to perform the image processing method of claim 15.

17. An image processing method comprising:
- scanning first code from a first image captured by a first camera;
- acquiring an image capturing state in a case where image is captured by a plurality of cameras other than the first camera;
- selecting a second camera from the plurality of cameras based on the image capturing state in a case where a piece of the first code has not been successfully scanned from the first image;
- acquiring a second image captured by the second camera;
- scanning second code from the second image; and
- acquiring a piece of the second code scanned from the second image in stead of the piece of the first code that has not been successfully scanned from the first image.

18. A non-transitory computer-readable storage medium storing executable instructions, which when executed by one or more processors of an image processing apparatus, cause the image processing apparatus to perform the image processing method of claim 17.

* * * * *